(12) United States Patent
Storch

(10) Patent No.: US 8,943,721 B2
(45) Date of Patent: Feb. 3, 2015

(54) PICTURE FRAME WITH RECORDING FUNCTION

(76) Inventor: Audrey Storch, Wayne, NJ (US)

( * ) Notice: Subject to any disclaimer, the term of this patent is extended or adjusted under 35 U.S.C. 154(b) by 0 days.

(21) Appl. No.: 13/562,286

(22) Filed: Jul. 30, 2012

(65) Prior Publication Data

US 2012/0291323 A1    Nov. 22, 2012

Related U.S. Application Data

(63) Continuation of application No. 12/688,472, filed on Jan. 15, 2010, now Pat. No. 8,230,630.

(60) Provisional application No. 61/145,426, filed on Jan. 16, 2009.

(51) Int. Cl.
*G11B 23/28* (2006.01)
*A47G 1/06* (2006.01)
*A63H 3/02* (2006.01)
*A63H 3/28* (2006.01)

(52) U.S. Cl.
CPC ............... *A47G 1/0616* (2013.01); *A63H 3/02* (2013.01); *A63H 3/28* (2013.01); *A63H 2200/00* (2013.01)
USPC ............. 40/417; 446/297; 446/308; 434/308; 360/99.13; 360/99.14; 360/92.1; 360/93; 360/60; 360/61

(58) Field of Classification Search
CPC ..................................................... G11B 23/28
USPC .................... 40/417; 446/297, 308; 434/308; 360/99.13, 99.14, 92.1, 93, 60, 61
See application file for complete search history.

(56) References Cited

U.S. PATENT DOCUMENTS

| | | | | |
|---|---|---|---|---|
| 4,237,647 A | * | 12/1980 | Shaw | 446/303 |
| 5,403,224 A | * | 4/1995 | Gintling | 446/321 |
| 5,738,561 A | * | 4/1998 | Pracas | 446/297 |
| 7,650,610 B2 | * | 1/2010 | Fukushima et al. | 720/605 |
| 2002/0078375 A1 | * | 6/2002 | Coates | 713/200 |
| 2010/0307036 A1 | * | 12/2010 | Lien et al. | 40/124.03 |

* cited by examiner

*Primary Examiner* — Syed A Islam
(74) *Attorney, Agent, or Firm* — Jon Fallon, Esq.; Michael P. Kochka, Esq.

(57) ABSTRACT

This invention is a huggable picture frame in the form of a person or doll, with an audio playback and recording unit. The shape of the invention is preferably a human shape in a soft sculpture, with a frame capable of holding a photograph. The audio playback and recording unit is activated by at least one remote button. The audio playback and recording unit contains a microphone or other audio input device and a speaker or other audio output device. The audio playback and recording unit and power supply are enclosed within the soft sculpture with sufficient cushioning that the presence of such relatively hard objects is not easily felt while the soft sculpture is hugged or squeezed. The overall impression of the picture frame is a huggable doll, which with a selected photograph, presents a reminder of a particular person to the user of the picture frame.

5 Claims, 3 Drawing Sheets

PICTURE FRAME WITH RECORDING FUNCTION

CROSS-REFERENCE TO RELATED APPLICATIONS

This Application is a continuation of U.S. patent application Ser. No. 12/688,472, entitled "Picture Frame with Recording Function," filed Jan. 15, 2010, which claims priority to U.S. Provisional Patent Application Ser. No. 61/145,426, filed Jan. 16, 2009.

BACKGROUND OF THE INVENTION

1. Field of the Invention

The present invention is in the field of picture frames with audio playback and recording functions and also in the field of soft sculpture picture frames in the form of a person or doll, where the soft sculpture picture frames have playback and recording functions.

2. Description of the Related Art

It is well known that separation from a loved one for an extended period of time can be emotionally difficult for the separated individuals. The difficulty of the separation may be aggravated by the circumstances of the separation and age of the people involved. For example, children may have difficulty in coping with the extended absence of a parent, especially where the parent or child is in a hospital, or where the parent is called to active duty in the armed forces.

One of the most common activities people engage in upon the end of a period of separation is a hug. Physical contact provides a level of emotional comfort and reassurance that cannot be simulated by other means. Children often rely upon stuffed animals and dolls for comfort when faced with the absence of a loved one or when in an emotional state.

Separation issues may also be addressed in part by telephone conversations between the separated individuals. Video conferencing is a preferred means for communication, as it provides the images and voices of the separated individuals. However, such telephone conversations or video conferences can only occur by coordinating the schedules and communication resources of the separated individuals.

Picture frames with recording functions are known in the art. However, such picture frames are generally rigid and impersonal. An impersonal picture frame merely provides the image of an enclosed photograph and is not soft and capable of being hugged comfortably.

As such, a normal picture frame does not provide significant emotional support for someone needing comfort. A hard picture frame cannot be comfortably held, nor can travel around without risk of breaking. A hard picture frame provides little tactile comfort for a user seeking emotional support.

In prior art products, a one-time prerecorded message is located in the belly of the product. The present invention is designed for safety, comfort, softness and is capable of being hugged to allow the invention to be used for comforting a user. Having a hard object in the body of a doll would be an impediment to a user hugging the doll.

It is desired to have a device that can provide comfort to at least one of a pair of separated individuals, with tactile, audio and visual elements. The invention was created to assist the separated individuals in coping with separation from the ones they love for any reason including illness, hospital stay, daycare, camp, preschool, college, nursing home, divorce, death, giving birth, special needs, lovers and any other reason.

SUMMARY OF THE INVENTION

This invention is a huggable picture frame in the form of a person or doll, with an audio playback and recording unit. The shape of the invention is preferably a human shape in a soft sculpture, with a frame capable of holding a photograph. The audio playback and recording unit is activated by at least one remote button, and preferably one remote button is used for activating the recording function and a second remote button is used for activating the playback function. The audio playback and recording unit preferably contains a microphone or other audio input device and a speaker or other audio output device. The audio playback and recording unit and power supply are enclosed within the soft sculpture with sufficient cushioning that the presence of such relatively hard objects is not easily felt while the soft sculpture is hugged or squeezed. The overall impression of the picture frame is a huggable doll, which with a selected photograph, presents a reminder of a particular person to the user of the picture frame.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
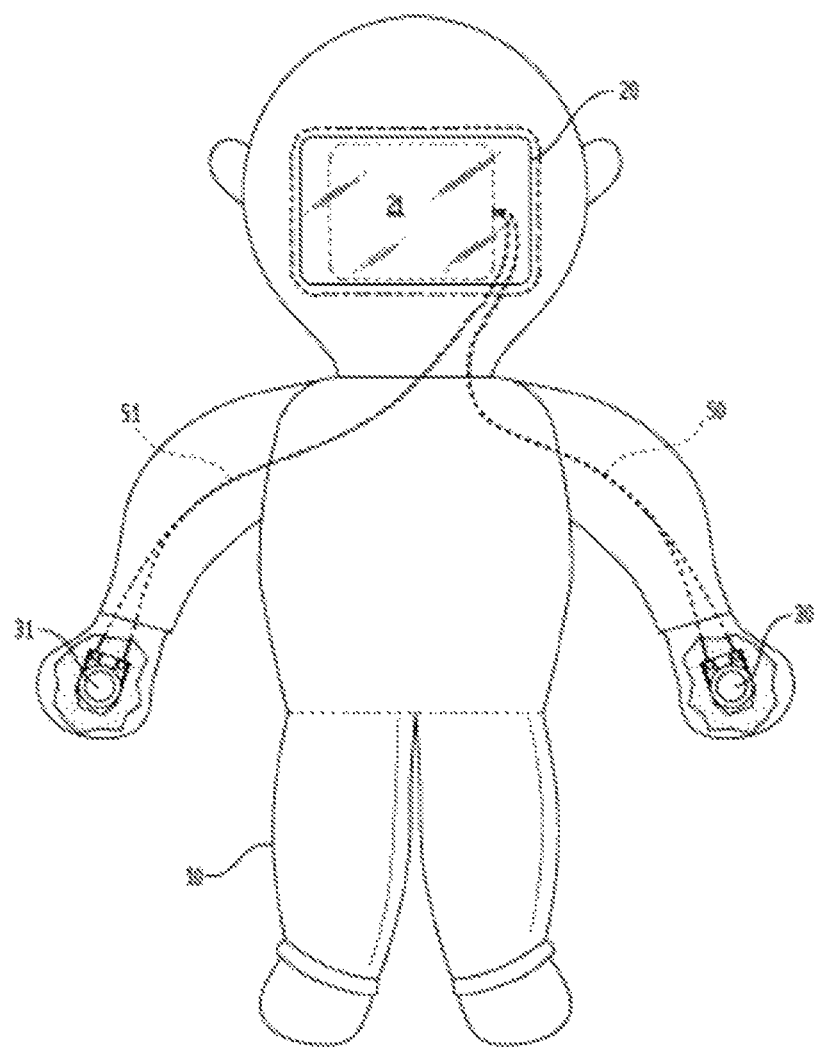
FIG. 1 is a front view of the invention, showing certain features of the invention, namely wiring, activation buttons, and audio recording and playback device as located within the invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The invention preferably consists of a human shaped doll 10, with an audio recording and playback device 40, audio input means 42, audio output means 41, power supply 43, activation buttons 30 and 31, wiring 50 and 51, and a picture frame 20 on the face of the human shaped doll 10.

The overall shape of the invention is preferably similar in construction to the design shown in commonly owned U.S.

Design Pat. No. Des. 429,780, which is incorporated herein by reference, but may be of any configuration, including animal or abstract shapes. The main body of the invention is soft and filled with a stuffing well known in the art of soft sculpture and stuffed toys.

The audio recording and playback device 40 includes audio input and output means and recording media for storing recorded audio, as are well known in the art. The audio input means 42 may be a separate microphone and the audio output means 41 may be a separate speaker, or the two may be combined into a single input and output device. The recording media may be any read-write capable media including but not limited to flash memory, optical or magnetic media. In the preferred embodiment, the recording media is fixed within the audio recording and playback device 40, but it may be removable and replaceable. Preferably, the audio recording and playback device will retain a recording between 5 and 30 seconds.

The audio recording and playback device 40 preferably includes a locking button or switch 45 to alternatively enable and disable the recording function, to preserve the recorded audio for a desired period of time, or otherwise prevent inadvertent recording over a desired message. Locking button or switch 45, electrically connected to the audio recording and playback device 40, is shown in the drawings as integral to audio recording and playback device 40, but may also be located along the arm of the human shaped doll 10 or in the head of the human shaped doll 10.

The audio recording and playback device 40 is contained in a single unit with a power supply 43 and is preferably located in the head portion of the human shaped doll 10, but can also be located in the torso section. In one embodiment, the audio recording and playback device 40 is contained in a concealed pocket 23 on the back of the head of the invention. The concealed pocket 23 is secured by a Velcro strip, preferably dyed to match the color of the head of human shaped doll 10.

By putting the audio recording and playback device 40 in a separate pocket 23 on the back of the head of human shaped doll 10, upon playing recorded audio, the invention provides the appearance of speaking out of the mouth of the human shaped doll 10.

Figure 2:
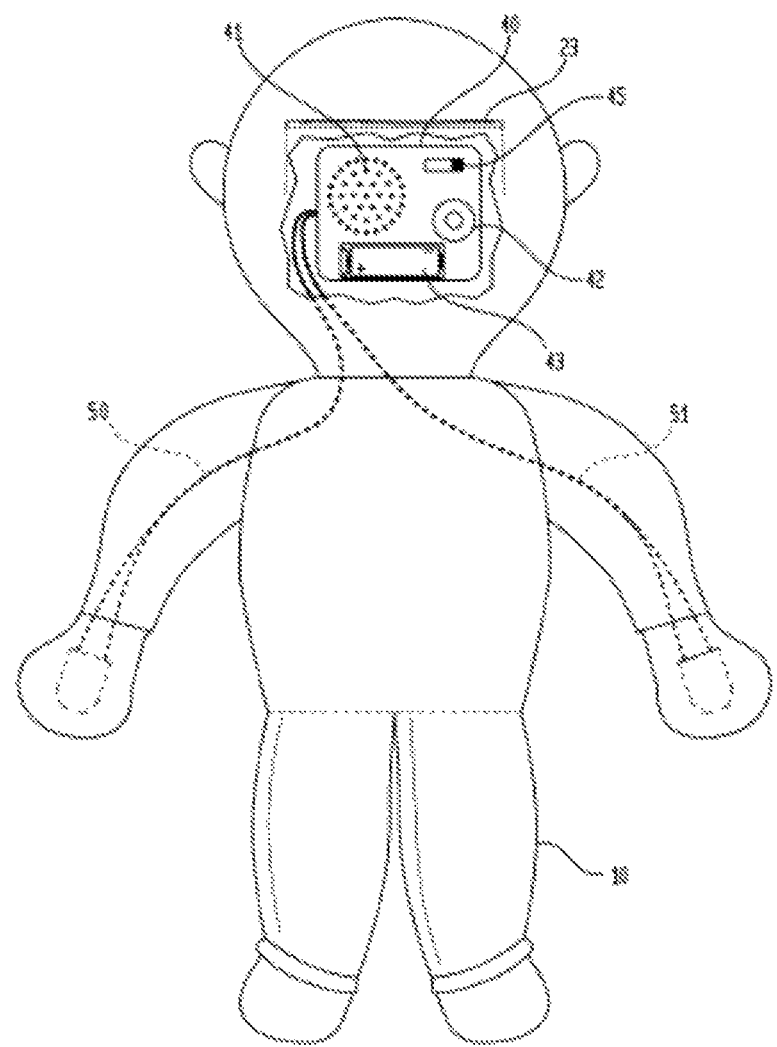
FIG. 2 is a rear view of the invention, also showing certain features of the invention, namely wiring, activation buttons, and audio recording and playback device as located within the invention.
Figure 3:
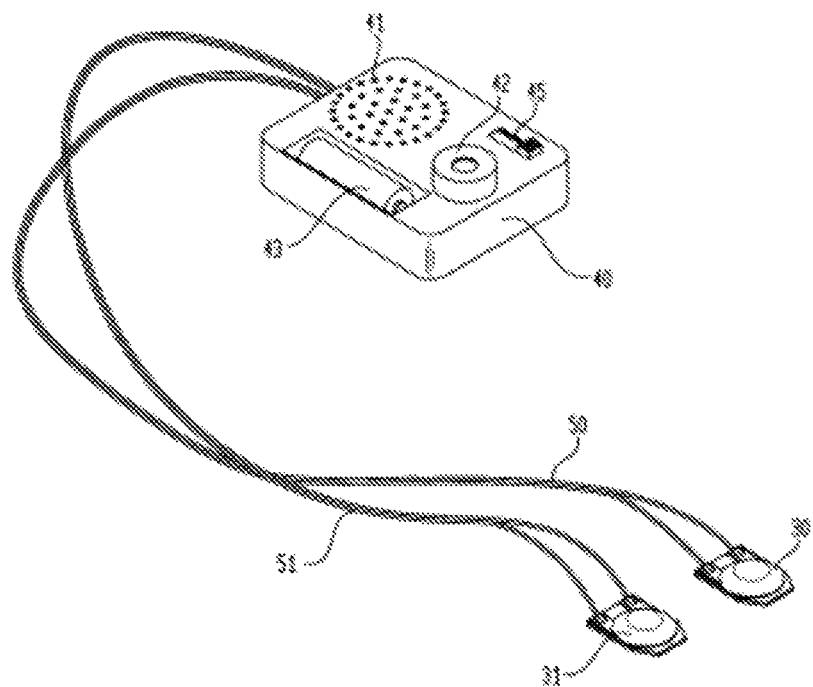
FIG. 3 is a view of the audio recording and playback device, wiring and activation buttons of the invention, removed from the overall invention.

The power supply 43 for the audio recording and playback device 40 is powered by conventional 1.5 volt watch/photo batteries or other power sources known in the art. FIGS. 2 and 3 show the use of a AA-sized battery for ease of understanding the invention. The pocket 23 in the head allows for easy access to change the batteries. The batteries may be included with the invention along with a protective plastic strip inserted during production to prevent battery leakage or power loss/drainage of the batteries. The clear plastic strip is easily accessible on the power supply 43, as is known in the art, and is preferably easily removable. This strip inside the power supply 43 is usually placed between any two of the batteries or between a battery and terminal connection, thereby interrupting the current flow and preventing operation of the audio recording and playback device 40. Removal of the strip completes the power circuit, and activates the audio recording and playback device 40 for operation.

The playback and recording functions of the audio recording and playback device 40 are be activated by at least one button or switch. In one embodiment, there are two buttons or switches, a first button or switch 30 for initiating recording of audio and a second button or switch 31 for initiating playback of audio. The two buttons or switches are usually not located adjacent to each other, to prevent inadvertent activation. In one embodiment, the first button or switch 30 is located at the end of one arm of the human shaped doll 10 and the second button or switch 31 is located at the end of the other arm of the human shaped doll 10, each at or near the "hand" of the appropriate arm.

The exterior design of the invention preferably includes a symbol of a mouth embroidered on the one hand of the human shaped doll 10, referred to throughout as the left hand. The first button or switch 30 is located inside the left hand, under the mouth symbol. A set of wires 50 extends down the left arm of the human shaped doll 10 to electrically connect the first button or switch 30 with the audio recording and playback device 40.

By pressing on the mouth icon on the left hand, the user will depress the first button or switch 30 located therein. Pressure on the first button or switch 30 will initiate the recording function of the audio recording and playback device 40. In one embodiment, continued pressure on the first button or switch 30 will enable the recording function, so that slight contact with the first button or switch 30 would not accidentally overwrite a recording. Releasing the first button or switch 30 would stop the recording function. The user would speak in the direction of the audio input means 42 within human shaped doll 10.

The exterior design of invention also preferably includes a symbol of an ear embroidered on the right hand of the human shaped doll 10, referred to throughout as the right hand. The second button or switch 31 is located inside the right hand, under the ear symbol. A second set of wires 51 extends down the right arm of the human shaped doll 10 to electrically connect the second button or switch 31 with the audio recording and playback device 40.

By pressing on the ear icon on the right hand, the user will depress the second button or switch 31 located therein. Pressure on the second button or switch 31 will initiate the playback function of the audio recording and playback device 40. Unlike the first button 30, the second button or switch 31 could activate with a single touch and preferably would not require continued or extended pressure.

Alternative buttons or activation switches may be utilized as is known in the art for the operation of electronic devices, including remote activation mechanisms such as infrared and radio transmitters.

The wires 50 and 51 and buttons or switches 30 and 31 are hidden from the user's view, being contained within the arms of the human shaped doll 10. Use of soft stuffing and soft exterior materials are preferably incorporated within the human shaped doll 10 to prevent or limit the user's awareness of the wires and buttons or switches.

The embodiments noted above may also be reversed, namely that the right hand may be used for recording and the left hand used for playback. Alternatively, the buttons or activation switches may be located in the legs and feet, or any other location on the invention.

The invention is manufactured to be safe for all ages. The pocket containing the audio recording and playback device is secured with a fastener such as Velcro®, such that more than minor force would be required to open the pocket. The wires are preferably heavily coated to prevent inadvertent electrical discharge.

The recording function preferably includes a high-quality microphone 42 so that audio may be recorded directly or over a telephone. The ability to record audio from over a telephone enables the invention to be utilized for recording messages from individuals remote from the invention.

The invention is capable of holding a picture in a clear pocket or picture frame 20 that is attached on the head of the human shaped doll 10, preferably in the location where a face might be found on a person. The picture frame 20 for the face is sewn and then sewn onto the head of the human shaped doll 10. A clear cover 21 is located within picture frame 20, forming a pocket through which an inserted photograph or other item may be seen. In one embodiment, the head of the human shaped doll 10 has an embroidered face so even when a real picture is not inserted, the invention provides a human-like appearance. Additional pockets may be provided on any part of the invention, such as on the torso of the human shaped doll 10 for displaying additional pictures or storing items.

In a preferred embodiment, the invention presents a photograph or image of an individual, with the individual's voice recorded on the audio recording and playback device 40. Activation of the playback function results in the individual's voice to appear to come out of the head or mouth of the human shaped doll 10, giving the illusion that the individual is physically present. Such "virtual" presence would be of some comfort or reassurance to a user of the invention.

The size of the overall invention may range from as small as 4" to any larger size. One embodiment measures between 11" to 17" from top to bottom. The picture can be of one person, many persons or the user can put just the face of a single person to make the human shaped doll 10 look like the person. The invention was created to be a huggable frame not to actually look like the person but can be used for any photograph, image or drawing.

The invention is able to record any message a user would want and to be allow a user to record over the message as often as desired. One embodiment of invention would hold any picture a user would want, for example, sized to 2"×3". The invention is designed to be used by speakers of any language, not just English speakers.

The body of the invention is a soft plush doll, capable of being hugged or held by children or adults. A similar shaped huggable picture frame, embodying the design of the above referenced U.S. Design Patent has been used by individuals of all ages and all genders in a variety of settings including hospitals, military families and others.

By designing the invention in a human form, a user can easily hug it with great comfort and can clearly hear their loved one speaking through the audio recording and playback device 40. By placing the speaker/recorder in an accessible pocket on the back of the head, the body of the invention remains soft and huggable, an improvement over prior art soft recordable dolls, which prior art devices placed the recording capabilities in the body of the doll.

The body of the invention is preferably covered with a hypoallergenic, stain resistant and spot cleanable fabric. Such fabric would make the invention safe for children with asthma, cancer or any other illness. Being well cushioned, the invention travels easily as it can be rolled it up or squeezed without breaking.

While certain novel features of the present invention have been shown and described, it will be understood that various omissions, substitutions and changes in the forms and details of the device illustrated and in its operation can be made by those skilled in the art without departing from the spirit of the invention.

What is claimed is:

1. A soft sculpture doll consisting of:
   a body;
   at least one extremity;
   an audio recording and playback device disposed in a pocket within the soft sculpture doll;
   a power supply contained within the soft sculpture doll electrically connected to the audio recording and playback device;
   an activation means for initiating recording by the audio recording and playback device;
   an activation means for initiating playback by the audio recording and playback device; and
   a locking member electrically connected to the audio recording and playback device, the locking member adapted to alternatively enable and disable the activation means for initiating recording by the audio recording and playback device;
   wherein the activation means for initiating playback is not disabled when the locking member is activated and the means for initiating recording by the audio recording and playback device is disabled.

2. The soft sculpture doll of claim 1, wherein the locking member comprises a switch.

3. The soft sculpture doll of claim 1, wherein the locking member comprises a button.

4. The soft sculpture doll of claim 1, wherein the locking member is integral with the audio recording and playback device.

5. The soft sculpture doll of claim 1, wherein the locking member is disposed in at least one extremity.

\* \* \* \* \*